(No Model.)

C. W. LEISER.
REPEATER.

No. 578,997. Patented Mar. 16, 1897.

WITNESSES:
L. N. Legendre
C. R. Ferguson

INVENTOR
C. W. Leiser
BY
ATTORNEYS.

UNITED STATES PATENT OFFICE.

CHARLES W. LEISER, OF CARLINVILLE, ILLINOIS.

REPEATER.

SPECIFICATION forming part of Letters Patent No. 578,997, dated March 16, 1897.

Application filed April 1, 1896. Serial No. 585,732. (No model.)

*To all whom it may concern:*

Be it known that I, CHARLES W. LEISER, of Carlinville, in the county of Macoupin and State of Illinois, have invented new and useful Improvements in Telegraph Instruments, of which the following is a full, clear, and exact description.

The purpose of my invention, which consists in an improvement in telegraph instruments, is to provide a cheaper instrument that is efficient, one that needs very little care and adjustment after being once adjusted to the circuits over which it is to be worked, owing to the few parts of the instrument, and an instrument that may be constructed of common telegraph-relays at a very small cost, thus obviating the necessity of building special new instruments. The altering of a common telegraph-relay does not interfere with the working of the relay for the service it was originally intended for.

I will describe an instrument embodying my invention and then point out the novel features in the appended claims.

Reference is to be had to the accompanying drawings, forming a part of this specification, in which similar characters of reference indicate corresponding parts in all the figures.

Figure 1:
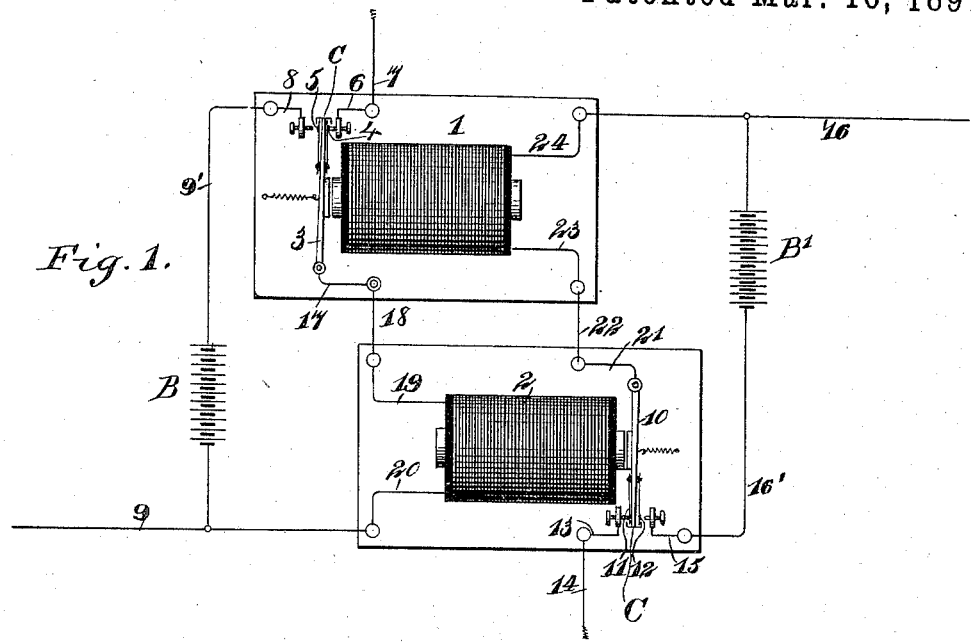
Figure 2:
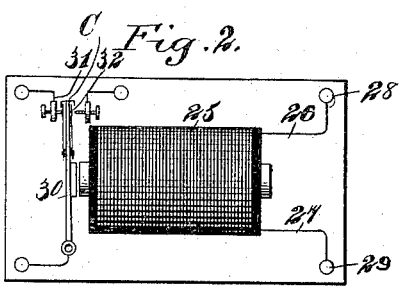
Figure 3:
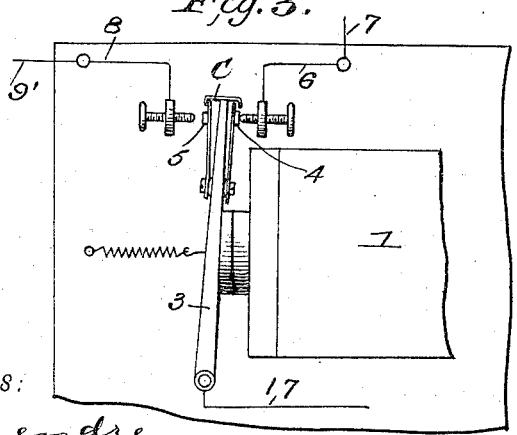

Figure 1 is a plan view of an instrument embodying my invention, and Fig. 2 is a plan view showing the instrument arranged as a relay. Fig. 3 is a detail on an enlarged scale.

Referring first to the example of my improvement shown in Fig. 1, 1 and 2 designate two sets of electromagnets. Coacting with the magnets 1 is an armature 3, carrying two yielding contacts 4 5. Contact 4 makes connection through 6 to ground-wire 7 and contact 5 makes connection with 8, thereby completing a local battery-circuit 9', cutting in battery B. Coacting with the magnet 2 is an armature 10, carrying two yielding contacts 11 12. Contact 11 connects, when attracted to relay, with the ground-wire 14. Contact 12 makes connection at 15 with local battery-circuit 16', thereby cutting in the battery B'.

The armature 3 of the magnet 1 has connections 17 18 with one wire 19 of the magnet 2, the other wire 20 of the magnet 2 being in connection with the main-line wire 9. The armature 10 of the magnet 2 has connections 21 22 with one pole 23 of the magnet 1, the other pole 24 of said magnet being in connection with the line-wire 16.

C C represent pieces fixed to top of armature to limit the movements of the yielding contacts and thereby prevent vibration of the yielding contacts.

It is obvious that one or both of the ground-wires 7 14 may be replaced by wires running to distant stations, and that either of the circuits thus extended has complete control of the other three branches, and, if necessary, batteries may be placed in said extended circuits.

The contacts 4 5 or 11 12 may be termed a "double" contact, and each double contact is so arranged that the armature makes a contact both on its forward and backward movements. The object in employing spring yielding contacts is so that while the armature is making a stroke it makes a contact in that direction just before breaking the contact on the side it is leaving. It will be observed that when the armature is attracted it closes a ground-circuit, and when released it closes a local circuit through the other main-line relay.

The example shown in Fig. 2 indicates the device when employed as a relay. It comprises an electromagnet 25, having its poles 26 27 connecting with binding-screws 28 29. An armature 30 coacts with the electromagnet and is designed to close a local sounder-circuit in the usual manner through the contact 32.

The electromagnets 1 and 2 are single-wound, and into magnet or relay 1 the current is led from the wires 16 and 24, and from the coil it is led out by 23 22 21, through armature 10 and parts 11, 13, and 14, to ground. All of these parts constitute, in effect, a main line, and I will therefore term it the "main line" 16. Into relay 2 comes a main line traced thus: 9 20, through coil, out at 19 18 17, through armature 3, and through 4 6 7 to ground. I will refer to this circuit as the "main line" 9. On each of these main lines is situated a battery to operate the instruments placed in the circuits of the main lines. If main line 16 is opened at any point, it opens main line 9 at contact 4. If main line 9 is opened at any point, it opens main line 16;

but by virtue of the construction and connection of the instruments, as illustrated, it is impossible to open but one of contacts 11 4 at the same time. When main line 16 is opened, the armature 3 is released and makes a connection at 5, thereby switching a local battery B into the relay 2, which prevents armature 10 from changing its position or opening main line 16, which gives a base or ground to close main line 16; or when line 9 is opened at any point the armature 10 is released and makes a contact at 12, thereby switching in a local battery B' or opening main-line circuit 9, thereby giving a base or ground to close main line 9.

Having thus described my invention, I claim as new and desire to secure by Letters Patent—

1. A telegraph-repeater, comprising two relays provided with armature-levers each having two spring-contacts, two stationary contact-points for each armature-lever, two batteries connected with the main lines and with the forward stationary contacts of the relays, and the electrical connections as herein described, whereby signals made on one line will be repeated on the other line.

2. A telegraph-repeater, comprising two relays provided with armature-levers each having two spring-contacts furnished with limiting-pieces, two stationary contact-points for each armature-lever, two batteries connected with the main lines and with the forward stationary contacts of the relays, and the electrical connections, the relays and their armatures being oppositely arranged with respect to each other, substantially as specified.

CHARLES W. LEISER.

Witnesses:
WILLIAM F. BURGDORFF,
JOHN S. HACKETT.